Dec. 14, 1965  W. T. RENTSCHLER  3,223,016
PHOTOGRAPHIC INTRA-LENS SHUTTER WITH DELAYED-ACTION DEVICE
Filed March 4, 1963

INVENTOR.
Waldemar T. Rentschler
BY
Arthur A. March
ATTORNEY

Dec. 14, 1965    W. T. RENTSCHLER    3,223,016
PHOTOGRAPHIC INTRA-LENS SHUTTER WITH DELAYED-ACTION DEVICE
Filed March 4, 1963    2 Sheets-Sheet 2

INVENTOR.
Waldemar T. Rentschler
BY
Arthur A. March
ATTORNEY

(abbreviated below — full content)

United States Patent Office 3,223,016
Patented Dec. 14, 1965

3,223,016
PHOTOGRAPHIC INTRA-LENS SHUTTER WITH DELAYED-ACTION DEVICE
Waldemar T. Rentschler, Calmbach (Enz), Germany, assignor to Alfred Gauthier, G.m.b.H., Calmbach (Enz), Germany, a corporation of Germany
Filed Mar. 4, 1963, Ser. No. 262,741
Claims priority, application Germany, Mar. 6, 1962, G 34,411
8 Claims. (Cl. 95—63)

The present invention relates in general to a photographic camera having an intra-lens shutter assembly in combination with a delayed action device, and more specifically to a camera of this type in which the running down motion of the shutter blades in the overlap phase thereof is used for releasing the delayed action device from its cocked position, and at which time the running down movement of the shutter blades is interrupted by a locking means which is controlled by the delayed action device until the running down movement of the delayed action device has been completed.

An object of this invention is to provide in a camera having an intra-lens shutter assembly in combination with a delayed action device means for effecting release of said delayed action device which is not dependent on any particular form of a shutter blade actuating member.

Another object of this invention is to provide in a camera having an intra-lens shutter assembly in combination with a delayed action device an arrangement in which the delayed action device is released from its cocked position either directly or indirectly by the operation of a shutter blade.

Another object of this invention is to provide in an intra-lens shutter camera construction having in combination therewith a delayed action device an arrangement to effect positive release of the delayed action device upon release of the shutter blades which is relatively simple in construction, inexpensive to fabricate and positive in operation.

Still another object of the invention is to provide in a camera having an intra-lens shutter assembly and a delayed action device, an arrangement in which the shutter blades effects release of the delayed action device and in which the latter has operated in conjunction therewith a control member for interrupting the running down movement of the shutter blades until the running down movement of the delayed action device has been completed.

In accordance with this invention the above objects, and other features and advantages are attained by an ararngement, in which the release of a locking device for retaining the delayed action device in its cocked position, and the arresting of the shutter blade driving mechanism, is effected either directly or indirectly by one of the shutter blades. The instant invention has particular application in those cameras in which the shutter blades are not actuated by a driving ring, but by a lever arrangement in which a substantial distance separates the shutter blade actuating member and the delayed action device.

This invention is attained by a cooperative relationship between the shutter blade actuating member and the delayed action device which does not require the use of any complicated and cumbersome transmission devices. Accordingly, the instant invention contemplates utilizing the shutter blade per se as the driving connection between the shutter assembly and the delayed action device. Therefore, with the construction of the instant invention a minimum number of component parts are required. In addition the arrangement of the instant invention provides for flexibility in construction and assembly for the reason that the shutter blade which is most favorably located may be utilized as the driving member in any particular camera construction. Further the shutter construction of this invention offers the same advantages as a shutter arrangement in which the release of the delayed action device and the arresting of the shutter blade driving mechanism is effected by the annular shutter blade actuating members heretofore used.

In accordance with this invention the release of the cocked delayed action device may be effected by means of an arresting lever whtch is constructed and arranged so as to have its outer end operatively associated with the arresting member of the delayed action device when in its cocked position. The lever is also provided with means for engaging the shutter blade in the inoperative position thereof whereby the arrangement of the arresting lever between the shutter blade and the delayed action device is such that the lever will follow the initial movement of the shutter blade upon the release thereof so as to effect release of the delayed action device in response thereto. Upon release of the delayed action device, means operatively associated with the delayed action device are provided for effecting a positive arresting action of the shutter blades prior to the opening thereof until running down movement until the delayed action device has been completed. Preferably the shutter blade arresting means comprises a control member which is drivingly connected to the delayed action device and is located in the plane of travel of the shutter blade, the construction being such that the shutter blade is released for opening and closing only when the running down movement of the delayed action device has come to its end.

A feature of this invention resides in the provision of an arresting lever which is constructed and arranged so as to follow the movement of the shutter blade upon the release thereof so as to effect the release of the delayed action device in response to the initial movement of the shutter blade.

Therefore, a feature of this invention resides in a provision of a relatively uncomplicated and economic means for effecting the arresting of the shutter blades during the running down movement of the delayed action device.

Other features and advantages will become more readily apparent when considered in view of the specification and drawings in which.

Figure 1:
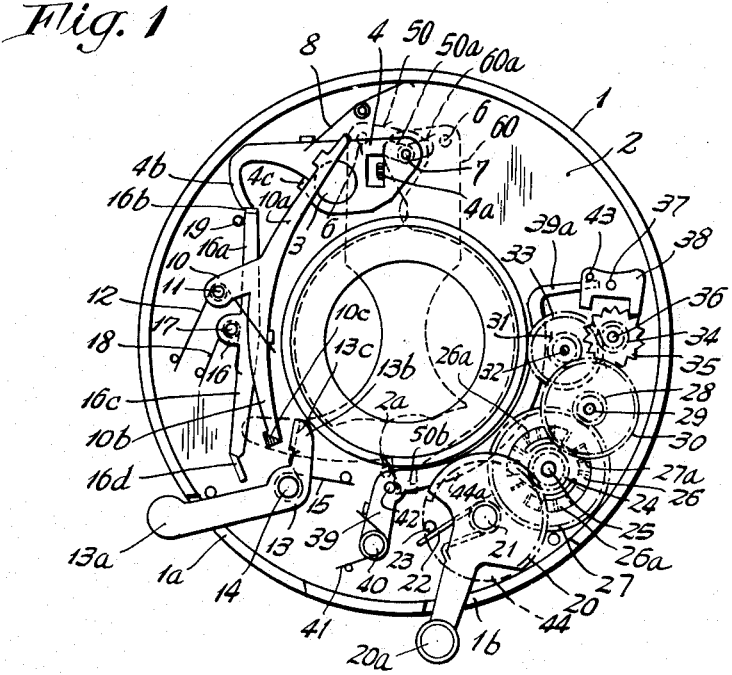
FIG. 1 is a front top view of the shutter assembly with the covering plate removed in which the shutter driving mechanism is shown in its inoperative state, and the delayed action device shown in its cocked position.

Referring specifically to the drawings, the housing 1 is provided for the photographic self-cocking shutter assembly. A base plate 2 is fixed within the housing in a well known manner and carries the members of the shutter mechanism. An actuating lever 4 is disposed about axis 3 on the base plate 2 and serves to actuate a pair of shutter blades 50, 60 which are located on the rear of the base plate 2. The lever 4 is provided with a bent portion or lug 4a. The shutter blades are carried on fixed pins 6 and are provided with slots 50a and 60a, respectively. The slots 50a, 60a are arranged to accommodate a pin 7 which is disposed on the actuating lever 4.

Figure 3:
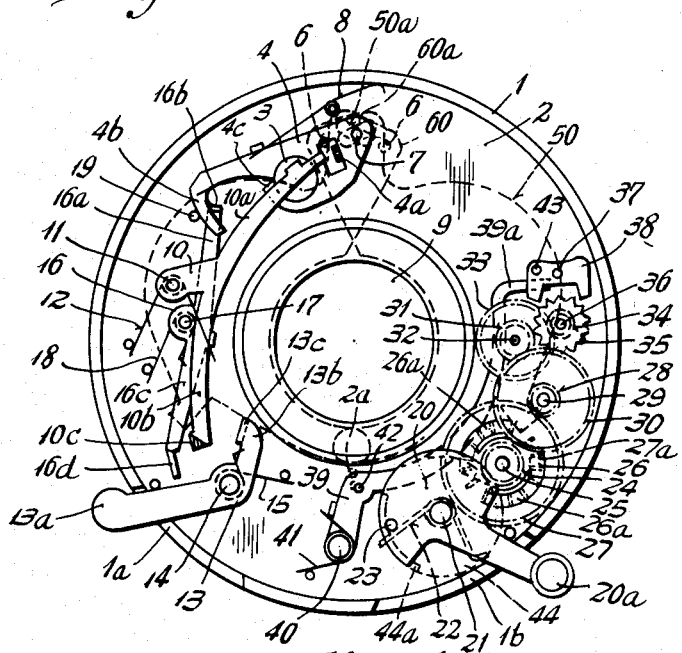
FIG. 3 shows a view similar to that of FIGS. 1 and 2 but illustrating another running down phase of the assembly in that the delayed action device has run down and the shutter blades are in fully opened position.

When the shutter is in operative position, the lever 4 is disposed as shown in FIG. 1 due to the effect which spring 8 has upon lever 4. In this position, the shutter blades are closed. When the actuating lever 4 is pivoted into the position clearly shown in FIG. 3, the shutter blades are opened to uncover the exposure aperture 9 of the shutter.

The lever 4 is driven by a two-armed driving lever 10 which is located about axis 11 on the base plate 2. The two-armed driving lever is influenced to move in a counterclockwise direction by a driving spring 12. The driving lever 10 is provided with an arm 10a which is in operative engagement with the driving lug 4a on the shutter blade actuating lever as will be hereinafter more fully described. The other arm 10b of the driving lever 10 is arranged to operatively engage a cocking and release lever 13 disposed about axis 14 on the base plate 2. The release lever 13 is normally maintained in the starting position shown in FIG. 1 by the influence of spring 15. The two-armed driving lever 10 is also provided with the bent portion of member 10c. Arm 13a defines a finger piece adapted to be manually engaged by the operator, as it projects through the slot 1a in the side wall of the shutter housing 1. The other arm 13b of the lever 13 is provided with a bent portion or lug 13c which is in operative engagement with the bent portion 10c of the driving lever 10. The bent portion 10c is so constructed and arranged that when the lever 13 moves in a counterclockwise direction effecting the cocking and release motion, the bent portion or lug 13c engages the bent portion or member 10c to thereby pivot the driving lever 10 in a clockwise direction. This pivoting motion accomplishes the cocking of the driving spring 12. During this pivotal movement, arm 10a of the driving lever 10 moves along the beveled edge of the driving lug 4a on the actuating lever 4 until such time as it becomes disengaged from and falls behind driving lug 4a. Further depression of the release lever 13 thereupon causes the lug 13c to release the driving lever 10 and under the action of spring 12 the driving lever 10 returns to its starting position. In the return to the starting position, the driving lever 10 operates the shutter actuating lever 4 to open the shutter blades 50 and 60. When the open position is achieved, the arm 10a of the driving lever 10 is disengaged from the lug 4a and engages another lug 4c of the actuating lever. This engagement causes the actuating lever 4 to pivot back to its starting position to close the shutter blades 50 and 60. The action of the spring 8 maintains the lever 4 in its starting position.

After accomplishing an exposure, in order to enable the cocking and release lever 13 to return in its inoperative position as shown in FIG. 1, the upper side of the bent portion or member 10c on the driving lever 10 is provided with a slanting surface over which the lug 13c of the lever 13 slides during the return motion of the lever 13.

In addition, a two-armed arresting lever 16 is disposed about axis 17 on the base plate 2 in order to retain the shutter blade actuating lever 4 in a starting position which corresponds to the closed position of the shutter blades 50 and 60 until the lever 13 has been disengaged from the lever 10. A spring 18 influences the lever 16 to maintain it in the arresting or locking position shown in FIG. 1 and movement thereof is prevented by a fixed stop pin 19 for the lever 16. An arm 16a on the lever 16 is provided with a lug 16b which, in the inoperative position of the shutter, is located in the path of movement of the projection 4b on the shutter blade actuating lever 4, and acts to maintain the shutter blade actuating lever 4 in the starting position which corresponds to the closed position of the shutter blades. The other arm 16c of the lever 16 is provided at its free end with a lug 16d adapted to operatively engage the lug 13c of the cocking and release lever 13.

In operation, when the release lever 13 is depressed, the shutter blade actuating lever 4 is maintained in position by the arresting lever 16 until such time as the lug 13c of the release lever 13 has become disengaged from the bent portion or member 10c of the driving lever 10. Upon such disengagement, the contact of the release lever portion 13c with the lug 16d causes the arresting lever 16 to pivot into the position illustrated in FIG. 2 in which position the lug 16b is disposed outside of the path of motion of the projection 4b of the shutter blade actuating lever 4.

Further, in accordance with the present invention, a delayed action device is arranged in the annular space of the shutter housing. This delayed action device is constructed in a well-known manner and comprises a toothed segment 20 fixed about axis 21. The toothed segment 20 has a manually engageable handle 20a projecting through the slot 1b n teh side wall of the shutter housing. A driving spring 22 located about the axis 21 is associated with the toothed segment 20 and the driving spring 22 is supported at one end by the toothed segment 20 and at the other end by fixed pin 23. The cocked state of the driving spring 22 is illustrated in FIG. 1.

A pinion 24 loosely disposed about axis 25 engages the toothed segment 20. The pinion 24 carries a disc 26 whose two elastic arms 26a are adapted to ride in slots 27a of the gear 27 which is arranged coaxially with the pinion 24. Upon the cocking motion of the toothed segment 20 the elastic arms 26a slide over the slots 27a whereby the gear 27 and the other members of the delayed action device connected to said gear 27 are in no way influenced. However, upon the running down motion of the toothed segment 20, the elastic arms 26a engage in the slots 27a to establish a driving connection between the toothed segment 20 and the gear 27. It will be understood that couplings of this type are well known and not novel.

The gear 27 operatively meshes with a pinion 28 disposed about axis 29 and is connected to a gear 30 whereby relative rotation between said gears is prevented. The gear 30 meshes with another pinion 31 located about a bearing axis 32. Another gear 33 is fixedly connected to the pinion 31 and meshes with pinion 34 of an anchor wheel 35 which is mounted about the axis 36. An anchor 38 which pivots about a bearing pin 37 is cooperatively engaged with the anchor wheel 35 in a well known manner.

Figure 4:
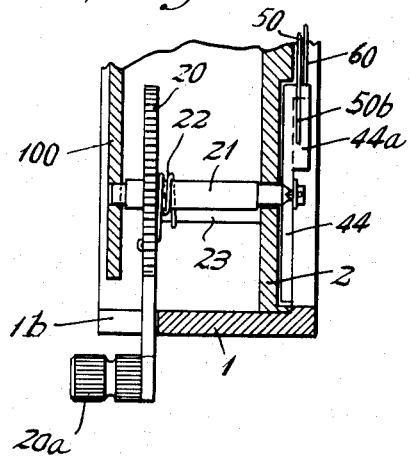
FIG. 4 is a longitudinal section taken through the shutter and base plate located therein to show a side view of the cocking and driving device of the delayed action means as well as the control member operating on the shutter blade.

The different axes of the delayed action device are disposed at one end in openings of the base plate 2 of the shutter, and at the other end on a bearing plate 100 (see FIG. 4) which is connected to the base plate 2 of the shutter in a manner not shown but, for example, by screws.

The release of the cocked delay action device is accomplished by a member of the released shutter blade driving mechanism. In accordance with the present invention, this is accomplished by the shutter blade 50 which cooperates for this purpose with a locking device hereinafter described in detail which serves to retain the delayed action device in cocked position. The release of the delayed action device takes place after the shutter blade 50 has traveled a small, annular path whereby the exposure aperture 9 of the shutter remains in closed position as a result of the overlapping of the shutter blades. After the delayed action device has been released, the running down of the shutter blade driving mechansim is immediately stopped and, in accordance with the present invention, this action is also accomplished by means of the shutter blade 50.

In the described and illustrated embodiment of the present invention which, it will be understood, is detailed merely for illustrative purposes, the locking device which arrests the delayed action device in cocked position comprises a unilateral lever 39 positioned about an axis 40 on the base plate 2 of the shutter. A pin 42 is provided on the lower side of the lever 39 and is adapted to be guided in a slot 2a of the shutter base plate 2 into the shutter blade chamber. By means of this pin 42 the lever 39 engages a projection 50b of the shutter blade 50 under the action of a light spring 41 when the shutter is inoperative, viz., at the fully closed position of the shutter blades. When the shutter is in inoperative position, one end 39a of the lever 39 engages a pin 43 of the escapement 38 to retain the escapement in the position shown in FIG. 1 in which it is locked by the wheel 35 to thereby maintain the delayed action device in its cocked position.

It will be understood that in place of the specific locking device described and illustrated in this embodiment of the invention, it is equally feasible to use other well known locking devices to maintain the delayed action device in its cocked position. For example, the arresting of the delayed action device may be accomplished by the shutter blade itself by constructing the shutter blade with a locking or arresting tooth to cooperate with the wheel 35.

When the delayed action device has been released, the arresting of the shutter blade driving mechanism is accomplished in the illustrated embodiment in a relatively simple and inexpensive way. This arresting merely utilizes a control member or cam 44 which cooperates with the shutter blade 50. The control cam 44 is disposed on the rear of the shutter base plate 2 in the path of movement of the shutter blades and is connected to the bearing axis 21 of the toothed segment 20 in such fashion as to prevent relative rotation. The cam 44 is provided with a projection 44a which is impinged by the projection 50b on the shutter blade 50 after the release of the delayed action mechanism is effected. The motion of the projection 44a is over a specific annular path which corresponds to the running down path of the delayed action device and the disengagement of the projection 44a with the projection 50b causes the shutter to be released for opening and closing after the termination of the running down of the delayed action device. It will be understood that instead of using the particular locking arrangement, the shutter blade driving mechanism may be arrested by a special arresting lever which is fixedly positioned and on which the shutter blade may impinge after the delayed action device has been released and which, in the course of the running down of the delayed action device, is pivoted out of the path of the shutter blade by a driving member of the said delayed action device.

Figure 2:
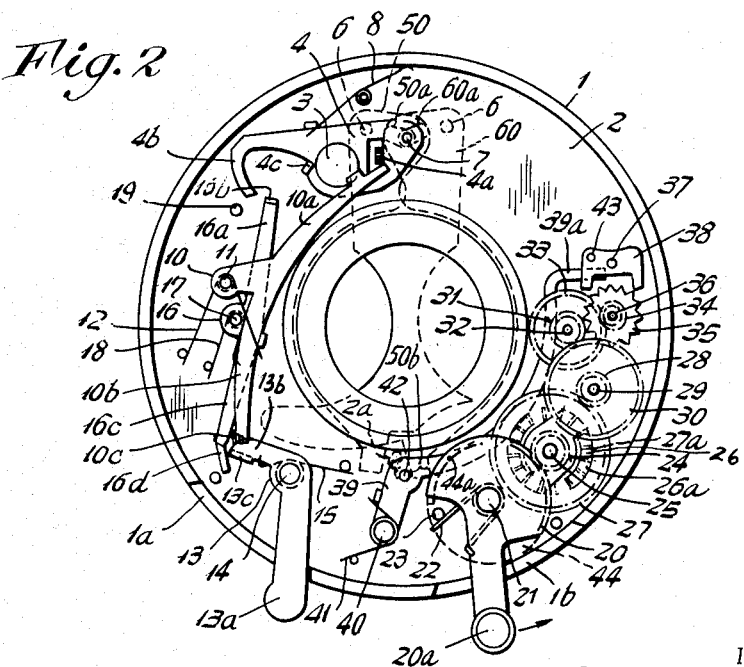
FIG. 2 illustrates the shutter construction of FIG. 1 during the releasing process immediately after the shutter blade driving member has been released by the actuation of the cocking and releasing lever of the shutter wherein the delayed action device has already been released for running down, and the shutter blade driving mechanism arrested.

Having heretofore described the details of the mechanism for accomplishing the result of the present invention, the method of operation of the above described embodiment of the shutter arrangement is as follows:

When exposures are to be made using the delayed action device, it is first cocked. To accomplish this result the finger piece 20a of the toothed segment 20 is moved into the position illustrated in FIG. 1. In this cocked position, the delayed action device is locked by the lever 39 in the manner hereinbefore described. The shutter blade driving mechanism may then be cocked and released by depressing the lever 13. After the release has been effected, the shutter blades 50 and 60 begin to open in a manner akin to the opening of a pair of shears. The lever 39, under the influence of spring 40, follows the opening motion of the shutter blade 50 whereby its end 39a releases the escapement 38 of the delayed action device. The arresting of the delayed action device is thereupon released, and the delayed action device begins to run down under the influence of driving spring 22 as illustrated in FIG. 2.

Immediately after the release of the delayed action device, the shutter blade projection 50b impinges on the projection 44a of the control cam 44 to again interrupt the running down motion of the shutter blade driving mechanism. The movement of the shutter blades until the impingement of the projection 50b with the projection 44a of the control cam 44 is not sufficient to cause the shutter blades to open over the exposure aperture 9. Thus the exposure aperture remains closed during such movement. As the delayed action device runs down, the projection 44a of the control cam 44 moves past the arm 50b of the shutter blade 50 and is finally disengaged therefrom. Thereupon, the shutter blade driving mechanism is enabled to continue its running down movement whereby the shutter blades are first opened and closed after having reached the open position.

The present invention has been illustrated and described by means of a photographic self-cocking shutter provided with two shutter blades. It will be understood, however, that independently of such specific illustration the present invention may be used with intra lens shutters of any type which comprise a delayed action device which is releasable by the motion of a member of the released shutter blade driving mechanism. The invention is extremely advantageous and provides a relatively simple and inexpensive mechanism to effect the release of the delayed action device and the subsequent arresting of the shutter blade driving mechanism. In addition, the present invention provides an arrangement of the delayed action device which is flexible and may be utilized in a variety of ways with freedom of choice of various parts.

It will be understood that while the invention has been described in detail, such description is merely for illustrative purposes and that without limitation various departures may be made from the specific construction without departing from the scope of the invention or of the appended claims.

I claim:

1. A photographic camera comprising a shutter mechanism including a pair of shutter blades mounted for mutually opposite movement between open and closed positions, and means for driving the same, a delayed action device, means on one of said shutter blades to engage said delayed action device and to effect the release thereof upon initial release of said shutter blades and prior to the opening of said blades, and means for prohibiting opening of said shutter blades until after the completion of the running down movement of said delayed action device.

2. A photographic camera comprising a lever type shutter mechanism including a pair of shutter blades, pivotal mounting means for both of said blades on the same side of said shutter mechanism, said blades moving in mutually opposite directions with a scissoring movement to open and close said shutter blades, means for driving said shutter blades, a delayed action device, means for locking said delayed action device in cocked position, and means comprising one of said blades for effecting release of said locking means, said releasing means including a lever, and means for normally biasing said lever against a shutter blade whereby said lever follows the initial movement of said shutter blade upon the release thereof to effect release of said locking means.

3. The invention as defined in claim 2 wherein said lever is constructed as a unilateral lever pivotally mounted at one end thereof, and said lever having its free end arresting said delayed action device in the cocked inoperative position thereof.

4. The invention as defined in claim 2 including means to arrest the run down of said shutter blades during the running down movement of said delayed action device.

5. The invention as defined in claim 4 wherein said arresting means includes a control means drivingly connected to said delayed action device, and said control means being disposed in the plane of movement of one of said shutter blades to prohibit the run down thereof until after the completion of the running down movement of said delayed action device.

6. A shutter for a photographic camera, said shutter comprising a pair of shutter blades, pivotal mounting means for each of said shutter blades closely adjacent to each other, said shutter blades moving in a scissoring movement between open and closed position, means for driving said shutter blades, means for cocking said shutter driving means, means for effecting the release of said cocked shutter driving means for effecting the operation of said shutter blades, a delayed action device, means for cocking said delayed action device when a delayed exposure is desired, means for locking said delayed action device in its cocked position, one of said shutter blades having means connected to said delayed action device to effect actuation of said locking means to effect run down of said cocked delayed action device upon initial movement of said shutter blades toward open position but prior to the opening thereof, and means operating on one of said shutter blades for prohibiting further run down of said shutter blades upon the release of said delayed action device until the completion of the running down of the delayed action device.

7. In combination with photographic camera having shutter blades actuated by means of a lever, the improvement of shutter blades mounted for movement between open and closed position, means for driving said shutter blades, means for cocking said shutter driving means, means for effecting the release of said cocked shutter driving means for effecting the operation of said shutter blades, a delayed action device, means for cocking said delayed action device when a delayed exposure is desired, a locking lever, said lever maintaining said delayed action device in its cocked position when the latter is cocked, one of said shutter blades having means to effect actuation of said locking means to effect run down of said cocked delayed action device upon the initial movement of said shutter blades toward open position but prior to the opening thereof, and means operating on one of said shutter blades for prohibiting further run down of said shutter blades upon the release of said delayed action device until the running down of the delayed action device has been completed, said latter means including a control member disposed in the patch of movement of one of said shutter blades for interrupting the movement thereof, and said control member being operatively connected to said delayed action device.

8. For use in a photographic camera the improvement of (a) pivotally mounted shutter blades for movement between open and closed positions,
(b) an actuating lever means for actuating said shutter blades,
(c) a two arm driving lever in operative engagement with said actuating lever,
(d) an arresting lever pivotally mounted in juxtaposition to said driving lever, said arresting lever being adapted to arrest the actuating lever of said shutter blades,
(e) a release lever operatively associated with said driving lever and arresting lever whereby the actuating of said release lever sequentially effecting the operation of said driving lever to said arresting lever to cock and release said shutter blades,
(f) a delayed action mechanism operatively associated with said shutter blades,
(g) means for cocking said delayed action mechanism when a delayed exposure is desired,
(h) a locking lever for maintaining said delayed action mechanism in its cocked position when cocked,
(i) one of said shutter blades having means to effect actuation of said locking lever to effect the run-down of said cocked delayed action mechanism upon initial movement of said shutter blades toward open position, but prior to the opening thereof,
(j) said shutter blade means including projection adapted to engage on a pin on said locking lever,
(k) and a means operating on said shutter projection to prohobit further run down of said shutter blades upon the release of said delayed action mechanism until said running down of the delayed action mechanism has been completed,
(l) said latter means including a control cam disposed in the path of said shutter projection for interrupting the movement thereof,
(m) and said control cam being operatively connected to said delayed action mechanism.

References Cited by the Examiner
UNITED STATES PATENTS

| | | | |
|---|---|---|---|
| 2,094,799 | 10/1937 | Lingg | 95—53.6 |
| 2,888,866 | 6/1959 | Gebele | 95—53.6 X |
| 3,103,862 | 9/1963 | Kiper | 95—53.3 |

JOHN M. HORAN, *Primary Examiner.*

NORTON ANSHER, *Examiner.*